(12) United States Patent
Baratta (10) Patent No.: US 9,573,199 B2
(45) Date of Patent: Feb. 21, 2017

(54) BOLT ON DRIVE ASSEMBLY FOR A CORE DRILL WITH HIGH STRENGTH SPOKED REINFORCER

(75) Inventor: Anthony Baratta, Oak Park, CA (US)

(73) Assignee: Western Saw, Inc., Oxnard, CA (US)

( * ) Notice: Subject to any disclaimer, the term of this patent is extended or adjusted under 35 U.S.C. 154(b) by 0 days.

(21) Appl. No.: 14/114,510

(22) PCT Filed: Apr. 26, 2011

(86) PCT No.: PCT/US2011/000748
§ 371 (c)(1),
(2), (4) Date: Jan. 7, 2014

(87) PCT Pub. No.: WO2012/148371
PCT Pub. Date: Nov. 1, 2012

(65) Prior Publication Data
US 2014/0112728 A1   Apr. 24, 2014

(51) Int. Cl.
*B23B 51/04* (2006.01)
*B27B 5/30* (2006.01)
*B28D 1/04* (2006.01)

(52) U.S. Cl.
CPC ......... *B23B 51/0473* (2013.01); *B23B 51/042* (2013.01); *B27B 5/30* (2013.01);
(Continued)

(58) Field of Classification Search
CPC ............... B23B 51/042; B23B 51/0473; B23B 2250/12; B27B 5/30; B28D 1/041; Y10T 408/895; Y10T 408/907
(Continued)

(56) References Cited

U.S. PATENT DOCUMENTS 1,426,881 A   8/1922   Lachman
1,503,716 A   8/1924   Seyferth
(Continued)

FOREIGN PATENT DOCUMENTS

CH        602304 A        7/1978
DE    202004008945        8/2004
(Continued)

OTHER PUBLICATIONS

Coja, Michael, European Search Report, EP 11775395, May 30, 2014, 5 pp., The Hague.
(Continued)

*Primary Examiner* — Eric A Gates
(74) *Attorney, Agent, or Firm* — Hendricks, Slavin & Holmes LLP (57) ABSTRACT

A bolt on drive assembly for a core drill which utilizes an improved high strength spoked reinforcer mounted beneath a disc. The disc and high strength spoke reinforcer are removably mounted on the tube by bolt fasteners. A drive connection is removably mounted and centrally located on a outer disc of the pair of discs. The drive connection is adapted to connect with a drive shaft to cause rotation of the tube. The system can also include a split in the disc when the high strength spoked reinforcer is not welded thereto thereby providing a means of water control. The high strength spoked reinforcer can be a separate piece that is bolted to the disc or can be integrally formed as one piece therewith. An adapter is provided that allows for standard drilling that fits into a recess in the center hub and is removable to expose the recess for attachment to a specialized drill motor, such as an A-flange.

29 Claims, 5 Drawing Sheets

(52) U.S. Cl.
CPC .......... *B23B 2250/12* (2013.01); *B28D 1/041* (2013.01); *Y10T 408/895* (2015.01); *Y10T 408/907* (2015.01)

(58) Field of Classification Search
USPC ................................ 408/204–207, 226, 703
IPC ............................................ B23B 51/04, 51/05
See application file for complete search history.

(56) References Cited

U.S. PATENT DOCUMENTS

| | | | |
|---|---|---|---|
| 1,591,003 | A | 6/1926 | Vincent |
| 1,669,273 | A | 5/1928 | Wojnowski et al. |
| 2,750,129 | A | 6/1956 | Morin |
| 2,779,361 | A | 1/1957 | McKiff |
| 2,906,256 | A | 9/1959 | Glynn |
| 2,925,739 | A | 2/1960 | Urquhart et al. |
| 2,950,582 | A | 8/1960 | Beauchaine |
| 3,382,939 | A | 5/1968 | McLendon, Sr. |
| 3,843,188 | A | 10/1974 | Kirschner |
| 3,884,527 | A | 5/1975 | Clary |
| 4,252,481 | A | 2/1981 | Krieg |
| 4,422,811 | A * | 12/1983 | Ellison ................ B23B 51/0426 125/20 |
| 5,460,432 | A | 10/1995 | Yamazaki et al. |
| 3,220,449 | A | 11/1995 | Franklin |
| 6,045,302 | A | 4/2000 | Orr |
| 6,494,276 | B1 | 12/2002 | Hamilton et al. |
| 6,514,017 | B2 | 2/2003 | DeBlasio |
| 6,890,132 | B1 | 5/2005 | Baron |
| 6,945,339 | B2 | 9/2005 | Hiranuma et al. |
| 8,790,052 | B2 | 7/2014 | Baratta |
| 2002/0094246 | A1 | 7/2002 | Jones et al. |
| 2005/0015980 | A1 | 1/2005 | Kottilingam et al. |
| 2005/0105980 | A1 | 5/2005 | Davis |
| 2009/0035082 | A1 | 2/2009 | Singh |
| 2011/0121090 | A1 | 5/2011 | Price |
| 2014/0112728 | A1 | 4/2014 | Baratta |
| 2014/0334892 | A1 | 11/2014 | Baratta |

FOREIGN PATENT DOCUMENTS

| | | |
|---|---|---|
| DE | 20306797 | 8/2006 |
| EP | 0603122 A1 | 6/1994 |
| GB | 2295109 | 5/1996 |
| GB | 2396395 | 6/2004 |
| RU | 2005581 C1 | 1/1994 |
| WO | WO-2011136839 | 11/2011 |

OTHER PUBLICATIONS

Coja, Michael, European Search Report, EP 11864551, Aug. 14, 2014, 6 pp., The Hague.
Young, Lee W., International Search Report, PCT/US2011/00581, Jun. 14, 2011, 1 page, ISA/US.
Copenhaven, Blaine R., International Search Report, PCT/US2011/000748, Aug. 1, 2011, 2 pages, ISA/US.
Baratta, Diamond Tooling Journal, Ultra lightweight core bit from Western Saw (online), created Jun. 21, 2010, modified Jun. 22, 2010 [retrieved on Jul. 21, 2011], retrieved from the Internet: http://www.dij-online.com/userfiles/file/Vol70Num624_14_15 pdf, 2 pp.
Yitagesu, Dereje, International Search Report, PCT/US2015/042682, Sep. 23, 2015, ISA/AU, 5 pages.
Yitagesu, Dereje, Written Opinion, PCT/US2015/042682, Sep. 23, 2015, Australia Patent Office, 5 pages.

* cited by examiner

BOLT ON DRIVE ASSEMBLY FOR A CORE DRILL WITH HIGH STRENGTH SPOKED REINFORCER

CROSS REFERENCE TO RELATED APPLICATIONS

This application is a National Stage 35 USC 371 filing of International Application No. PCT/US2011/000748, filed Apr. 26, 2011, currently pending.

BACKGROUND OF THE INVENTION

Field of the Invention

The field of this invention relates generally toward cutting implements and more particularly to the construction of a core drill.

Description of the Prior Art

Core drills are commonly used for drilling holes in hard materials, such as concrete and masonry. These holes are then used to support a structural member, such as a post, which is used on a support member for a building structure or for forming a large diameter borehole with the borehole being used for the passage of pipe lines or conduits. A typical core drill is constructed of hard metal, such as steel, and takes the shape of a tube with hardened cutting segments mounted at one end of the tube. The opposite end of the tube is closed generally by a solid steel plate with there being a drive connection mounted on this steel plate. The drive connection is to be connected to a rotating shaft of a drive machine which will cause the tube to be rotated and affect the cutting operation. The cutting segments at one end normally comprise diamonds but also it has been known to use silicon carbide. The diamonds are held together by a suitable resin adhesive.

The plate at the closed end of the tube is of substantial thickness, generally one half to one and a half inch thick. These core drills are frequently designed to be from six inches to thirty-six inches and more in diameter. The steel plate at the closed end is of substantial weight. It is important to have an extremely strong member at this closed end because all the force from the driving machine is being transferred to this member to the tube. The force encountered by the tube in cutting the hole in masonry and concrete is substantial so it is important that the plate at the closed end of the tube establish an extremely strong connection. However, most often these core drills are carried by a human from one location to another. The plate member at the closed end of a sixteen inch core drill is substantially heavier than the core drill constructed in accordance with this invention. That extra weight can make the difference as to whether a core drill can be carried by a single human from one location to another. It is readily apparent that the greater the diameter of the core drill the greater of the additional amount of weight. It would be desirable to design some type of closed end structure for a core drill which would be substantially lighter in weight than if a solid plate is used. Furthermore, there is a certain amount of deflection associated with the use of the core drill.

At times, when operating of a core drill, a plug of material, which would be normally masonry or cement, gets caught within the hollow chamber of the core drill adjacent the closed end plate. At the present time, access into this area is only provided through the open end of a core drill which means some kind of an elongated member has to be extended up through the hollow chamber of the core drill and this member wedged against the caught material and somehow loosen it to dislodge it. It would be desirable to construct a core drill so that the closed end portion of the core drill could be removed from the tube which would provide immediate local access to any wedged material that is caught within the hollow chamber and located directly adjacent the closed end.

The instant invention is an improvement over U.S. patent application Ser. No. 12/799,615 in that the apparatus is modified to accommodate large drilling operations that utilize an A-flange motor attachment. The A-flange motor is the second most common drill motor standard in the construction drilling industry. The A-flange use a Ø6" flange with a Ø5" boss that slips into the A-flange receptacle, and (4) ⅜"-16 THD bolts to attach to the A-flange. The instant invention allows the operator to adapt to whichever drill motor is required for the job within minutes. application Ser. No. 12/799,615 provides a drive plate that requires a drill motor with a 1¼"-7 shaft. The drive plate is attached to the drilling apparatus using 6 ½"-13 THD button head cap screws. Once the drive plate is removed, it reveals the A-flange pocket and (4) ⅜"-16 THD bolts to attach the A-flange motor.

SUMMARY OF THE INVENTION

The instant invention teaches a bolt on drive assembly for a core drill comprising: a cylindrical tube having a cutting edge at one longitudinal end and an open end at an opposite longitudinal end; a mounting means mounted at said open end; a high strength spoked reinforcer, said spoked reinforcer having a center hub from which extends radially a plurality of spoked members, said spoked members having a strengthening member extending perpendicularly therefrom in the direction of the Z-axis and wherein said spoked members being attached to said mounting means wherein said center hub has a recessed portion that is substantially circular in shape on the side directly opposing said spoked members; a disc mounted onto said high strength spoked reinforcer and also onto said mounting means wherein said disc includes a center aperture corresponding to said recessed portion in said center hub; a drive connection centrally mounted on said disc, said drive connection adapted to connect to a drive shaft to cause rotation of said tube; and a series of removable fasteners to secure said disc and said high strength spoked reinforcer to said mounting means.

The above embodiment can be further modified by defining that the tube has a hollow chamber, said mounting means comprising a mounting ring, said mounting ring being located within said hollow chamber.

The above embodiment can be further modified by defining that a water stop disc is mounted to said high strength spoked reinforcer, said water stop disc to function to prevent the passage of water from within said hollow chamber through said open end.

The above embodiment can be further modified by defining that the drive connection comprises a coupler adapted to be threadably secured to a drive shaft.

The above embodiment can be further modified by defining that the coupler is removably mounted with bolt fasteners to said high strength spoked reinforcer.

The above embodiment can be further modified by defining that the high strength spoked reinforcer is integrally formed as one piece with said disc.

The above embodiment can be further modified by defining that each of said plurality of spoke members is offset from said center hub.

The above embodiment can be further modified by defining that each of said plurality of spoke members includes one or more supports along the length of each of said plurality of spoke members.

The above embodiment can be further modified by defining that said recessed portion has a diameter to correspond to a specific drilling drive motor.

The above embodiment can be further modified by defining that an adapter corresponding to the diameter of said specific drilling motor is fitted through said aperture in said disc and into said recessed portion and attached thereto.

The above embodiment can be further modified by defining that a drive nut is attached to said adapter.

DETAILED DESCRIPTION OF A PREFERRED EMBODIMENT

The principle of the instant invention involves thin support spars 90 degrees to the top plate and water plate. Since sheet steel is rolled, it is anisotropic because it has slightly different stiffness properties that vary from the direction of roll. For this reason, simply cutting the spars perpendicular to the direction of roll and rotating them on end increases the stiffness in the direction of the applied load. Once the spars are interlapped and welded to both the drive and water plate, the structure acts similarly to several I-beams radiating from the axis of rotation to the periphery of the tube. For this reason, the material can be much thinner than the thick plate used in prior art systems, thus giving the entire apparatus a strongly desired lighter weight.

The neutral axis is an axis in the cross section of a beam or shaft along which there are no longitudinal stresses or strains. If the section is symmetric and is not curved before a bend occurs, then the neutral axis at the geometric centroid. All material on one side of the neutral axis are in a state of tension, while those on the opposite side are in compression. Therefore, while under drilling conditions, the drive plate and the shear plate see compressive and tensional loads, respectively, and the spars only see compression. In the event of lifting the tube out of the hole with a concrete plug stuck inside, the drive plate and the shear plate see tensional and compressive loads, respectively, and the support spars see tensional loads only.

In the instant invention, an A-flange motor attachment is utilized that applies the load over a larger area than the standard drive nut. Because of this, it can handle even larger loads with less deflection.

Turning to the drawings, the preferred embodiment is illustrated and described by reference characters that denote similar elements throughout the several views of the instant invention.

Figure 6:
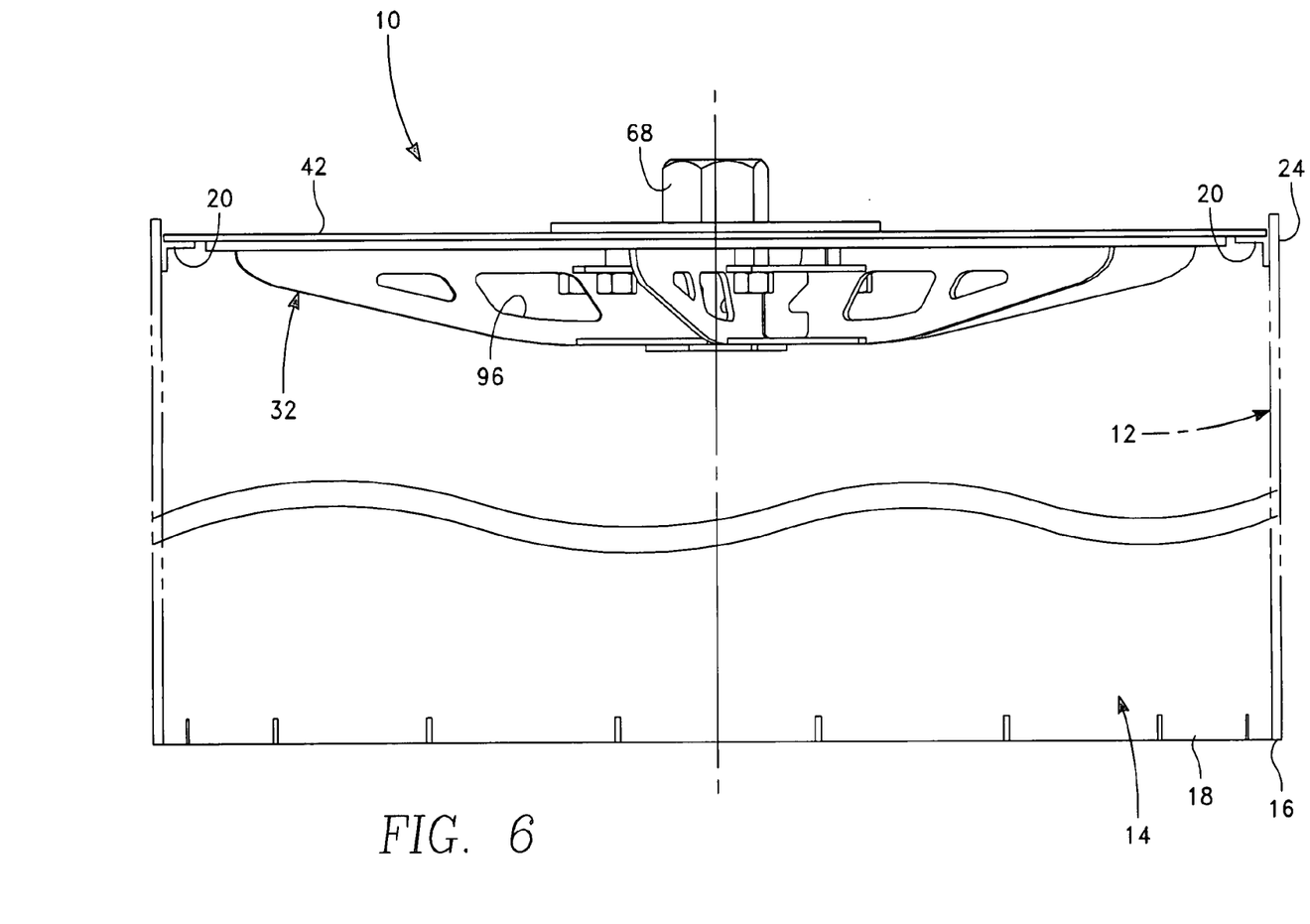
FIG. 6 is a side view of the entire system in place, including the adapter in the recess for use with a standard drill motor.
Figure 7:
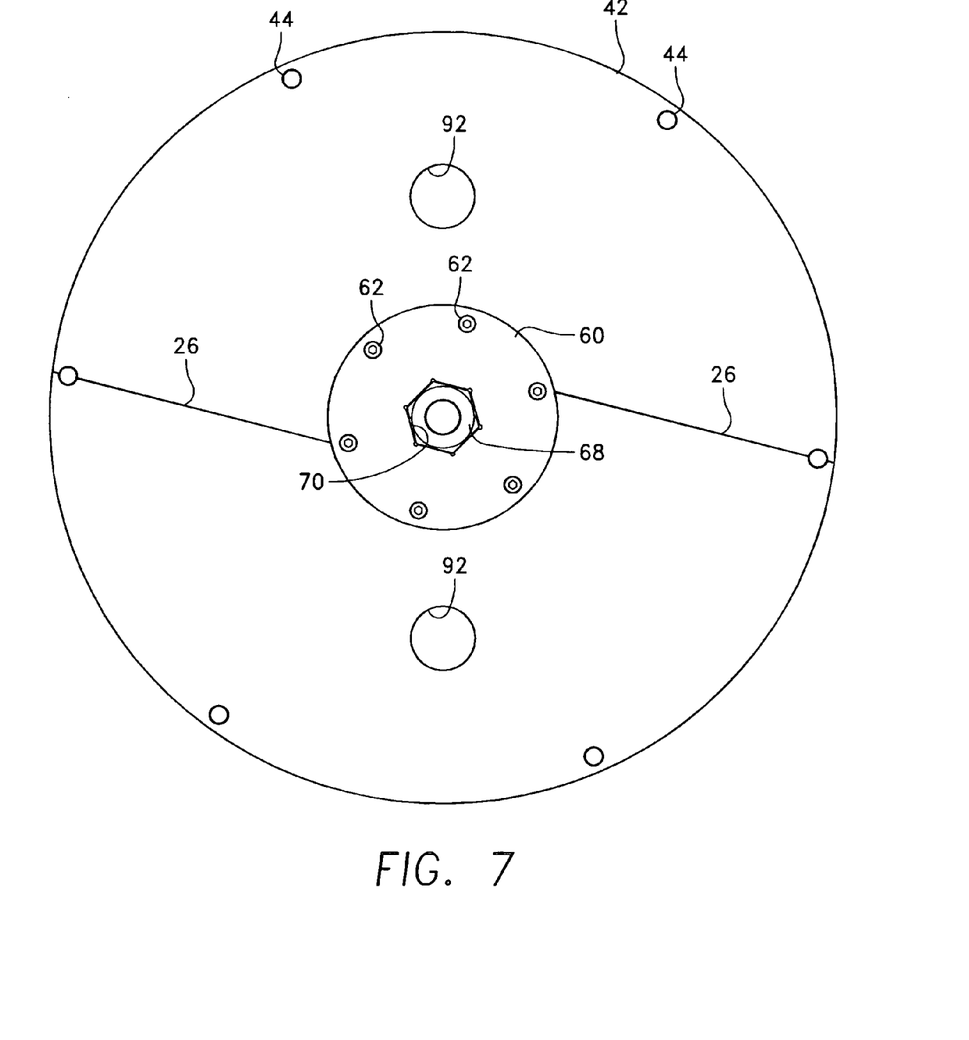
FIG. 7 is a top view of the system with the drive nut adapter in place.

Referring particular to FIG. 6, there is shown a complete illustration viewed from the side of the invention. The core drill 10 has a body that is in the shape of a tube 12. This tube 12 will have variable diameter. The tube 12 has a through hollow chamber 14. At one longitudinal end 16 of the core drill 10, there is adhesively or otherwise permanently affixed a series of cutting segments 18. Generally, the cutting segments 18 will comprise diamonds. The cutting segments 18 are what produce the cut within the material, which is generally cement or masonry. This cut is produced by rotation of the tube 12.

At the opposite longitudinal end of the tube 12 from one longitudinal end 16 there is located a mounting ring 20. The mounting ring 20 is generally no more than one-half to three-quarters of an inch wide and is to be fixedly mounted to the wall of the hollow chamber 14 a slight distance spaced from the outer edge 24 of the tube 12. Normally, this spacing of the mounting ring 20 will be no more than one-half inch. The mounting ring 20 is generally fixedly secured to the tube 12 by welding.

Mounted within the hollow chamber 14 is a disc 42. The disc 42 functions as a cover. The disc 42 has a series of through holes 44 located directly adjacent the peripheral edge of the disc 42 (See FIGS. 3-5, 7). The through holes 44 align with through holes 40 for each of the radial arms 38 of a high strength spoked reinforcer 32 (See FIG. 3). A bolt fastener (not shown) is to be placed through each of the aligned holes 44, 40 and then be threadably tightened within the threaded hole 22. This will secure in place the drive assembly which is composed minimally of the high strength spoked reinforcer 32 and the disc 42. Water is frequently used when drilling of cement and masonry in order to minimize the creation of heat. Water control can also be achieved by an optional split 26 in the disc 42 as well as one or more apertures 92 found thereon. The drive assembly, which is composed of the high strength spoked reinforcer 32 and the disc 42 is exceedingly strong but is much lighter in weight than if it were a completely solid steel plate. This has an advantage in that the overall core drill is lessened in weight therefore facilitating its carryability by a human.

In the center of the disc 42 is an aperture 48 with a diameter that corresponds to a specific drill motor, size, i.e., an A-flange type drill motor. An A-flange type drive motor can be attached directly to the high strength spoked reinforcer 32 through this aperture 48 and into a recess 50 in the center of the high strength spoked reinforcer 32. The A-flange motor is secured in place through a series of apertures 52 surrounding the center aperture 48. Attachment points are easily seen in FIG. 5.

Figure 1:
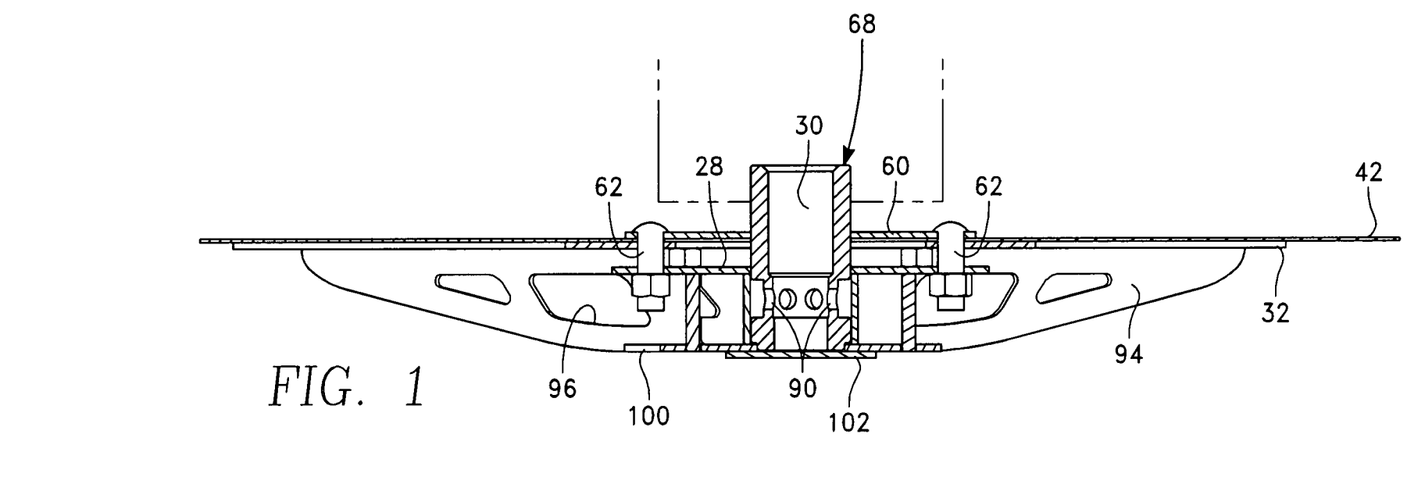
FIG. 1 is a side view of the bolt on drive assembly of the instant invention with the drive nut for a standard drill attached thereto.
Figure 2:
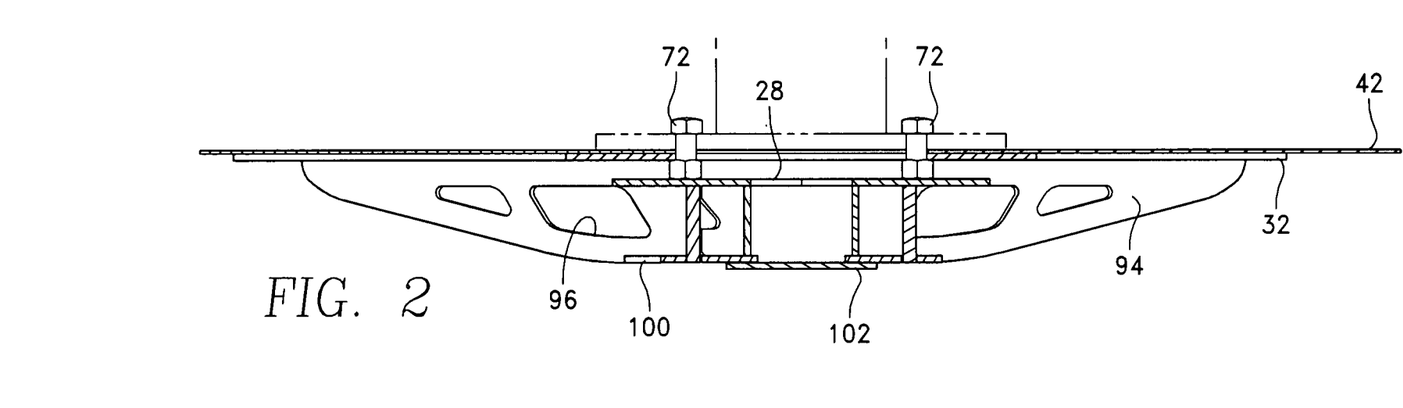
FIG. 2 is a side view of the bolt on drive assembly of the instant invention without the drive nut attachment shown in FIG. 1 and for use with an A-flange drill motor.

FIG. 2 shows a side view of the A-flange motor drill in use. To use a standard drill (for example as shown in FIG. 1), an adapter 60 is attached to the disc 42 and secured in place through bolts 62 (See FIG. 7) through holes 64 (See FIG. 4) in the adapter 60 that correspond to a series of holes 66 surrounding the center aperture 48 in the disc 42.

For use with a standard drill, this adapter 60 has a drive nut 68 welded thereto that will fit a standard drill. The drive nut 68 is shown to fit into an aperture 70 in the shape of a hexagonal nut. The driving machinery is to effect rotation of the drive connection 68 and the entire core drill 10.

The high strength spoked reinforcer 32 is situated either as a separate part (See FIG. 3) or as an integral welded piece to the disc 42 (See FIGS. 1-2). The high strength spoked reinforcer 32 has a centrally located hub 50 which is the recessed aperture for use with an A-flange drill motor directly or for the attachment of an adapter 60. Extending radially outward from the hub 50 is a plurality of spaced apart radial arms 38. There are shown six in number of the arms 38. Typically, there will only be used six in number of the arms 38 when the diameter of the tube 12 is thirty inches and less. As the diameter increases, the number of arms 38 may be increased. Directly adjacent the outer end of each of the arms 38 is a through hole 40. A through hole 40 is to be in alignment with a through hole 44 on the plate 42. A water stop base 28 sandwiches the high strength spoked reinforcer 32 and the disc 42.

As can be seen in FIGS. 1-2 and 6, the high strength spoked reinforcer 32 extends along the Z-axis and is 3-dimensional. It is this 3-dimensional structure that provides for the increased performance at high weights with reduced deflection vs. weight ratios. The deflection vs. weight ratio mimics a solid plate's performance whereas a 2-dimensional spoked reinforcer sees significant deflection at higher weights. The high strength spoked reinforcer 32 serves the two fold purpose of reduced weight for larger diameter cores and reduced deflection at said large diameters.

FIGS. 1-2 show a cross-sectional side view of two different modes of operation. FIG. 1 shows the method with the adapter 60 with the standard drill nut 68 in place. FIG. 2 shows a side view where there is no adapter for use with an A-flange drill motor. The A-flange motor is bolted on directly with four bolts 72. Drill fluid, usually water, enters through the cavity 30 in the drive nut 68. There are apertures 90 to allow for drainage of the fluid. Control of the fluid flow is also achieved by holes 92 in the disc 42. (See FIGS. 3-5, 7).

The arms 38 of the high strength spoked reinforce 32 include corresponding arms 94 in a downward direction perpendicular from the plate 42. These arms 94 can be solid or contain apertures 96 as shown, for weight reduction. The shape in the z-axis can be substantially rectangular, triangular or any shape that helps to add strength in this direction.

Figure 3:
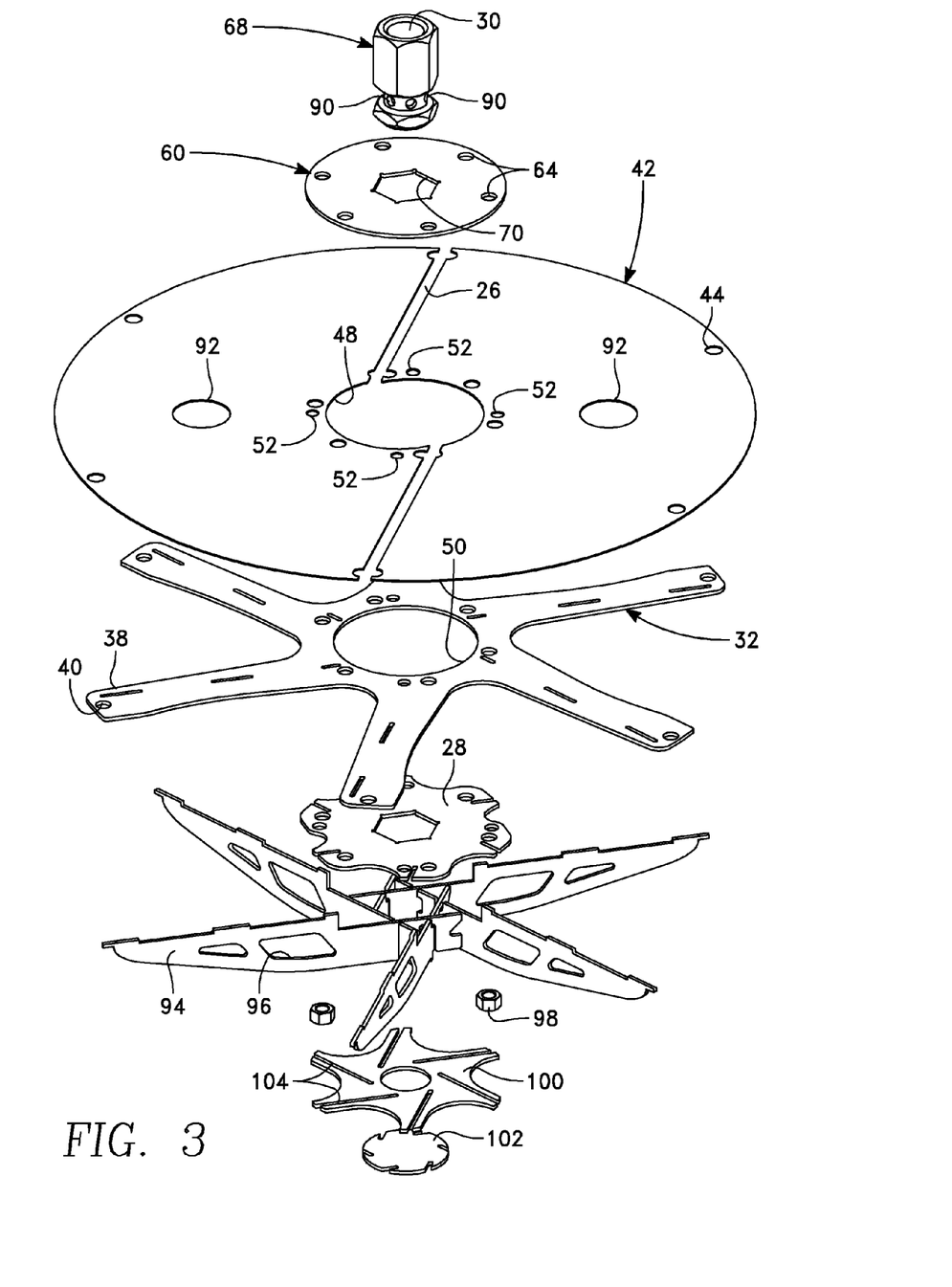
FIG. 3 is an exploded view of the invention.
Figure 4:
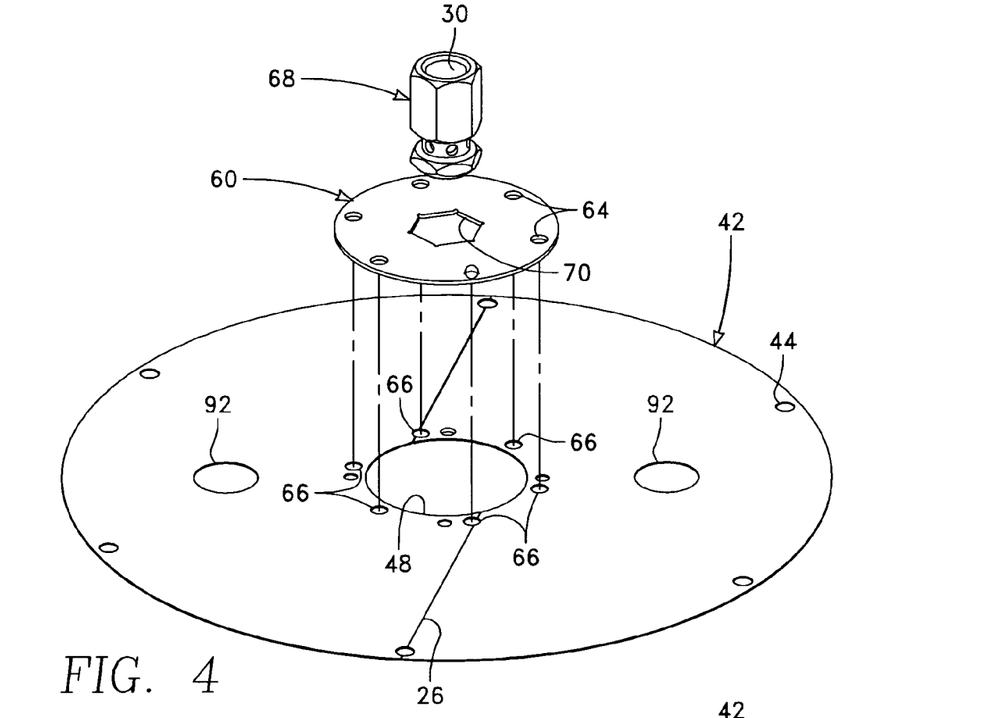
FIG. 4 is an exploded view of the disc with the adapter with drive nut for use with standard drill motors.
Figure 5:
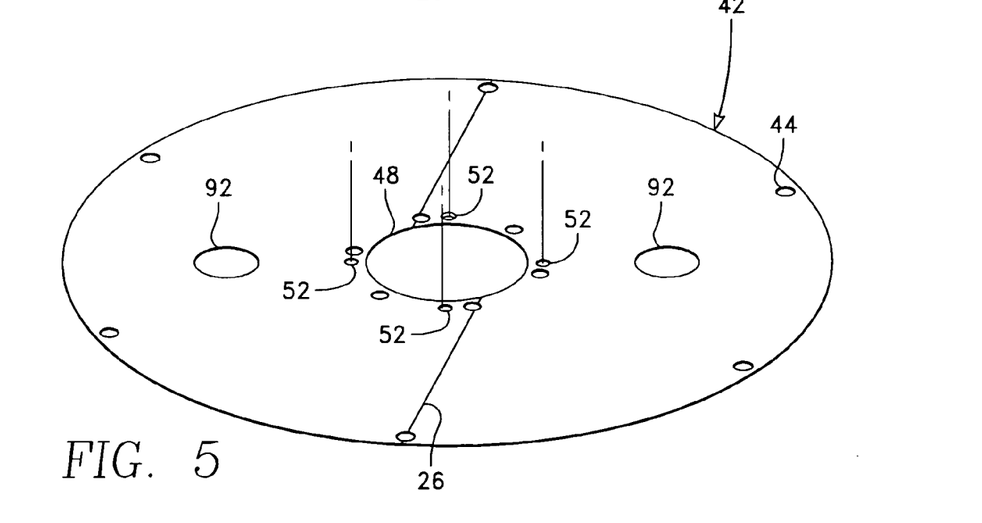
FIG. 5 is an exploded view of the disc for use with direct attachment to an A-flange drill motor.

In FIG. 3, nuts 98 secure bolts (not shown) holding the entire system together, including bottom plates 100 and 102. Note that the entire system can also be welded into one integral piece, save the adapter 60, which needs to remain removable for the versatility afforded by the invention. The penultimate bottom plate 100 includes grooves 104 for placement therein of corresponding z-axis arms 94. The bottom plate 102 provides added support for the entire system.

The discussion included in this patent is intended to serve as a basic description. The reader should be aware that the specific discussion may not explicitly describe all embodiments possible and alternatives that are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A bolt on drive assembly for a core drill comprising:
    a cylindrical tube having a cutting edge at one longitudinal end and an open end at an opposite longitudinal end;
    a mounting means mounted at said open end;
    a high strength spoked reinforcer, said spoked reinforcer having a center hub from which extends a plurality of spoked members, said spoked members having a strengthening member extending perpendicularly therefrom in the direction of the Z-axis and wherein said spoked members are attached to said mounting means wherein said center hub has a recessed portion that is substantially circular in shape on a side spaced apart from said spoked members;
    a disc mounted onto said high strength spoked reinforcer and also onto said mounting means wherein said disc includes a center aperture corresponding to said recessed portion in said center hub;
    a drive connection centrally mounted on said disc, said drive connection adapted to connect to a drive shaft to cause rotation of said tube;
    a series of removable fasteners to secure said disc and said high strength spoked reinforcer to said mounting means such that the one longitudinal end is spaced longitudinally from the high strength spoked reinforcer; and
    wherein the recessed portion includes a plurality of slots in a periphery of the recessed portion.

2. The bolt on drive assembly as defined in claim 1 wherein said tube has a hollow chamber, said mounting means includes a mounting ring, said mounting ring being located within said hollow chamber.

3. The bolt on drive assembly as defined in claim 1 wherein a water stop disc is mounted to said high strength spoked reinforcer, wherein said water stop disc is configured to prevent the passage of water from within said cylindrical tube through said open end.

4. The bolt on drive assembly as defined in claim 1 wherein said drive connection includes a coupler adapted to be threadably secured to a drive shaft.

5. The bolt on drive assembly as defined in claim 4 wherein said coupler is removably supported by bolt fasteners by said high strength spoked reinforcer.

6. The bolt on drive assembly as defined in claim 1 wherein said high strength spoked reinforcer is integrally formed as one piece with said disc.

7. The bolt on drive assembly as defined in claim 1 wherein each of said plurality of spoked members is offset from said center hub.

8. The bolt on drive assembly as defined in claim 1 wherein each of said plurality of spoked members includes one or more supports along the length of each of said plurality of spoked members.

9. The bolt on drive assembly as defined in claim 1 wherein said recessed portion has a diameter to correspond to a specific drilling drive motor.

10. The bolt on drive assembly as defined in claim 9 wherein an adapter corresponding to the diameter of said specific drilling motor is fitted through said aperture in said disc and into said recessed portion and attached thereto.

11. The bolt on drive assembly as defined in claim 1 wherein a drive nut is attached to said hub.

12. The bolt on drive assembly as defined in claim 11 wherein the drive nut includes a plurality of openings.

13. The bolt on drive assembly as defined in claim 1 wherein a plurality of strengthening members includes projections corresponding to a plurality of openings in a plurality of spoked members.

14. The bolt on drive assembly as defined in claim 1 wherein the recessed portion includes an opening having flat sides.

15. The bolt on drive assembly as defined in claim 1 wherein a first strengthening member engages a second strengthening member.

16. The bolt on drive assembly as defined in claim 15 wherein the first strengthening member engages a third strengthening member.

17. The bolt on drive assembly as defined in claim 1 wherein the strengthening members are substantially planar.

18. A bolt on drive assembly for a core drill comprising:
a cylindrical tube having a cutting edge at one longitudinal end and an open end at an opposite longitudinal end;
a mounting means mounted at said open end;
a high strength spoked reinforcer, said spoked reinforcer having a center hub from which extends a plurality of spoked members, said spoked members having a strengthening member extending perpendicularly therefrom in the direction of the Z-axis and wherein said spoked members are attached to said mounting means wherein said center hub has a recessed portion that is substantially circular in shape on a side spaced apart from said spoked members;
a disc mounted onto said high strength spoked reinforcer and also onto said mounting means wherein said disc includes a center aperture corresponding to said recessed portion in said center hub;
a drive connection centrally mounted on said disc, said drive connection adapted to connect to a drive shaft to cause rotation of said tube;
a series of removable fasteners to secure said disc and said high strength spoked reinforcer to said mounting means such that the one longitudinal end is spaced longitudinally from the high strength spoked reinforcer; and
further including a plate having grooves for engaging portions of the strengthening members.

19. A bolt on drive assembly for a core drill, the assembly comprising:
a spoked reinforcer having a central hub with a plurality of spokes extending outward from the central hub to end portions, the end portions including means for mounting the spoked reinforcer to a cylindrical core drill tube, the means for mounting the spoked reinforcer being positioned relative to each other to define a plane;
a plurality of substantially planar strengthening members contacting respective spokes perpendicular to the plane and extending to respective end portions spaced apart from the plane, and wherein at least two of the end portions are positioned relative to each other to define a second plane spaced apart from the first plane; and
a recessed portion contacting a plurality of the strengthening members and positioned between the first and second planes and spaced apart from the first and second planes, and wherein the recessed portion is positioned to allow at least one drive element to contact the recessed portion through an opening in the central hub.

20. The drive assembly of claim 19 further including a disc mounted to the spoked reinforcer on a side opposite the strengthening members.

21. The drive assembly of claim 19 wherein the spokes are substantially planar.

22. The drive assembly of claim 19 wherein the spokes extend in respective directions that do not intersect a center of the spoked reinforcer.

23. The drive assembly of claim 19 wherein the plurality of planar strengthening members interengage with others of the strengthening members.

24. The drive assembly of claim 19 wherein the recessed portion is substantially planar.

25. The drive assembly of claim 19 wherein the recessed portion includes slots in a periphery of the recessed portion.

26. The drive assembly of claim 19 wherein the recessed portion includes openings for receiving fasteners.

27. The drive assembly of claim 19 further including a plate engaging the at least two end portions of the strengthening members.

28. The drive assembly of claim 27 wherein the plate includes an opening in a central portion of the plate.

29. A bolt on drive assembly for a core drill, the assembly comprising:
a planar spoked element having an upper planar surface and a lower planar surface and a plurality of spokes extending from a central portion on a central axis, wherein the central portion includes a wall defining an opening, wherein the plurality of spokes includes means for mounting the spoked element to a cylindrical core drill tube;
a plurality of substantially planar strengthening members extending perpendicular to respective spokes at the lower planar surface and extending away from the planar spoked element to respective end portions spaced apart from the lower planar surface, and wherein each of the strengthening members includes notches which combined define a cavity concentric with the central axis and wherein the cavity includes a cavity lower planar surface;
a recessed portion positioned in the cavity and spaced apart from the lower planar surface of the spoked element; and
a lower plate engaging respective end portions of the strengthening members.

* * * * *